(12) United States Patent
Kittell

(10) Patent No.: US 9,457,681 B2
(45) Date of Patent: Oct. 4, 2016

(54) METHOD FOR HIGH-CURRENT RAPID CHARGING

(71) Applicant: Robert P. Kittell, Brentwood, TN (US)

(72) Inventor: Robert P. Kittell, Brentwood, TN (US)

(*) Notice: Subject to any disclaimer, the term of this patent is extended or adjusted under 35 U.S.C. 154(b) by 53 days.

(21) Appl. No.: 14/289,387

(22) Filed: May 28, 2014

(65) Prior Publication Data

US 2014/0253048 A1 Sep. 11, 2014

Related U.S. Application Data

(62) Division of application No. 13/238,456, filed on Sep. 21, 2011, now Pat. No. 8,803,477.

(60) Provisional application No. 61/384,939, filed on Sep. 21, 2010.

(51) Int. Cl.
| | |
|---|---|
| H01M 10/44 | (2006.01) |
| H01M 10/46 | (2006.01) |
| B60L 11/18 | (2006.01) |
| H02J 7/00 | (2006.01) |
| H01M 10/625 | (2014.01) |
| H01M 10/63 | (2014.01) |
| H01M 10/613 | (2014.01) |

(52) U.S. Cl.
CPC .......... *B60L 11/185* (2013.01); *B60L 11/1874* (2013.01); *B60L 11/1879* (2013.01); *H01M 10/44* (2013.01); *H01M 10/613* (2015.04); *H01M 10/625* (2015.04); *H01M 10/63* (2015.04); *H02J 7/007* (2013.01); *Y02E 60/12* (2013.01); *Y02T 10/705* (2013.01); *Y02T 10/7005* (2013.01); *Y02T 10/7011* (2013.01); *Y02T 10/7016* (2013.01); *Y02T 10/7072* (2013.01); *Y02T 10/7088* (2013.01); *Y02T 90/121* (2013.01); *Y02T 90/128* (2013.01); *Y02T 90/14* (2013.01)

(58) Field of Classification Search
CPC ....... H02J 7/0013; H02J 7/1423; H02J 7/007
USPC .......................... 320/124, 125, 160; 324/430
See application file for complete search history.

(56) References Cited

U.S. PATENT DOCUMENTS

| | | | |
|---|---|---|---|
| 2003/0102845 A1* | 6/2003 | Aker | H02J 7/0042 320/139 |
| 2005/0068005 A1* | 3/2005 | Yamashita | H02J 7/0016 320/116 |

* cited by examiner

*Primary Examiner* — Edward Tso
(74) *Attorney, Agent, or Firm* — Soquel Group LLC

(57) ABSTRACT

A high-current rapid charging battery module for an electric vehicle including a case, one or more battery cells inside the case, a ventilation system that draws air upward through holes in the bottom of the case from the exterior of the vehicle, massive copper busbars, each busbar electrically connecting a positive lead on one battery cell to a negative lead on a different battery cell, an air flow cartridge between each pair of adjacent battery cells, and one or more fans arranged on top of one or more cells that blow air drawn upward through the holes in the bottom of the case away from the top of the battery module.

9 Claims, 10 Drawing Sheets

METHOD FOR HIGH-CURRENT RAPID CHARGING

REFERENCE TO RELATED APPLICATIONS

This application claims benefit of U.S. Provisional Application No. 61/384,939, entitled Battery Module For High-Current Rapid Charging, filed on Sep. 21, 2010 by inventor Robert P. Kittell.

FIELD OF THE INVENTION

The present invention relates to a battery that can be very rapidly charged using a high input current. In particular, the invention deals with thermal management, packaging, bulk charging envelope, and dynamic rapid charging methods that enable rapid charging of electric vehicle batteries using high current.

BACKGROUND OF THE INVENTION

Electric vehicles (EVs) and plug-in hybrid electric vehicles (PHEVs), henceforth referred to as EVs, offer the promise of decreasing reliance on oil for transportation products and services. Commercial EVs are beginning to appear in the marketplace. One shortcoming that has been recognized is that charging of EV batteries takes a long time, limiting their daily utility. Another shortcoming in commercially available EVs is the low amount of energy delivered during a rapid charge due to their small pack size or limited bulk charge envelope.

To achieve a driving range of 300 miles or more, roughly equivalent to the range afforded by internal combustion engines (ICEs) using petroleum-based fuel, energy storage of 260 amp hours at 350 volts (or 91 kW-hrs) would be typically required. With the currently available technology, such a battery cannot be rapid charged to over 80% SOC within twenty minutes.

As an example of the dimension of the challenge, charging a battery module with 4 cells in series, each with a capacity of 260 amp hours, to 89% SOC in 20 minutes during an initial "bulk charge" phase requires an input current of 700 amps (260 amp hours*0.89 SOC*60 minutes/hour/20 minutes/0.9917 amp-hr efficiency=700 A). This level of charge current and bulk charge envelope are required to provide an EV with a driving range of up to 300 miles.

A battery module solution capable of repeated high-current rapid charging cycles with a large bulk charge envelope offers the promise of enabling motorists to experience the driving range afforded by internal combustion engines (ICEs) and may hasten the adoption of EVs.

A major barrier to high-current rapid charging is that batteries based on common chemistries, including lithium-ion, experience catastrophic failures when they are overheated. One cause of battery heating when rapid charging is the increased rate of the chemical conversion processes within the battery cell. A second cause of battery heating when rapid charging is the internal resistance of interconnects to each battery cell terminal. A third cause of battery heating when rapid charging is the ability to extract waste heat from the module. Lack of solutions to the aforementioned problems has thus far hindered commercial availabilty of rapid charge battery packs and high power charging systems.

Overheating of battery modules may prevent multiple rapid charge cycles during a day. This is because the waste heat generated during a twenty minute rapid charge and subsequent driving may cause a battery to reach temperatures that prohibit a second rapid charge in the absence of a prolonged cool down period after driving. Therefore, it would be desirable to have a battery module capable of high-current rapid charging that applies thermal management treatments to avoid overheating.

Prior art air cooling systems for battery packs draw air in at the front of a battery pack and exhaust heated air at the rear. Air heats up as it travels through the pack. So the air's cooling capacity diminishes as it flows through the pack, resulting in battery cells at the rear of a pack that are hotter than those at the front. Therefore, it would be desirable to have an air cooled battery pack that draws air in and circulates fresh air at every module to maintain thermal uniformity among cells within each module, and among all the modules in a battery pack.

In summary, a battery module that rapidly charges at high current, to a high SOC, with high thermal uniformity across all cells in the module, and to do so repeatedly without exceeding upper termperature limits, thus maximizing an EV's daily driving range, would be highly desirable.

SUMMARY OF THE DESCRIPTION

The present invention concerns a battery, referred to as a high-current rapid charge battery module, that can be rapidly charged at high currents, while meeting temperature constraints during the charging process. Both a high-current rapid charge battery module and its application to a high-current rapid charge battery pack are disclosed.

The subject invention performs heat extraction through a series of thermal management treatments, including directed air flow, air flow cartridges, thermal mass, and packaging. Battery cell interconnects are designed for thermal dissipation.

The high-current rapid charge battery module is capable of reaching at least 89% state of charge within 20 minutes, while restricting temperature increase to less than or equal to 15 degrees C. during charging. Further, a finish charge tapering to low currents brings the battery to 100% SOC within 10 additional minutes.

The subject invention includes embodiments of a battery module that uses air cooling to prevent overheating while rapid charging at high current. The battery module draws air from the bottom exterior of a vehicle up, vertically, between cells, and forces air horizontally out across the top of the module using blower fans. At the pack level, this air is exhausted away from the air inlet through exhaust ducting. The battery module avoids "short circuiting," in which the intake of air is contaminated with the warmer exhaust air.

A battery management system (BMS) that implements a dynamic charging algorithm and sends control signals to a battery charger is disclosed. The standard algorithm for charging lithium-ion batteries is modified to account for internal resistance that contributes a measurable voltage rise at each cell interconnect.

BRIEF DESCRIPTION OF THE DRAWINGS

The present invention will be more fully understood and appreciated from the following detailed description, taken in conjunction with the drawings in which.

DETAILED DESCRIPTION

The invention is described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as devices, methods, processes, or systems. Accordingly, the present invention may take the form of an entirely hardware embodiment or an embodiment combining software and hardware aspects. The following detailed description is, therefore, not to be taken in a limiting sense.

As used herein the following terms have the meanings given below:

Electric vehicle or EV—as used herein means a vehicle that uses one or more battery packs for its sole power source, or a hybrid electric vehicle or a plug-in electric vehicle that supplements power from fuel-based internal combustion with electric power drawn from one or more battery packs.

Rapid charge—as used herein refers to a charge to a battery module in which the bulk charge phase completes in less than or equal to sixty minutes, preferably in less than thirty minutes and most preferably in 20 minutes or less.

High-current rapid charge—as used herein refers to a rapid charge where the input current during the bulk charge phase is at least 150 amps, preferably at least 400 amps and most preferably 700 amps.

Busbar, also referred to as interconnect—means a rigid conductive bar used for electrical connections. In some EV applications, the term busbar refers to connections between two battery modules while the term interconnect refers to electrical connections between battery cells within a battery module. The term busbar is used inclusively herein to refer to rigid connections between battery modules and between cells within a battery module.

Figure 1:
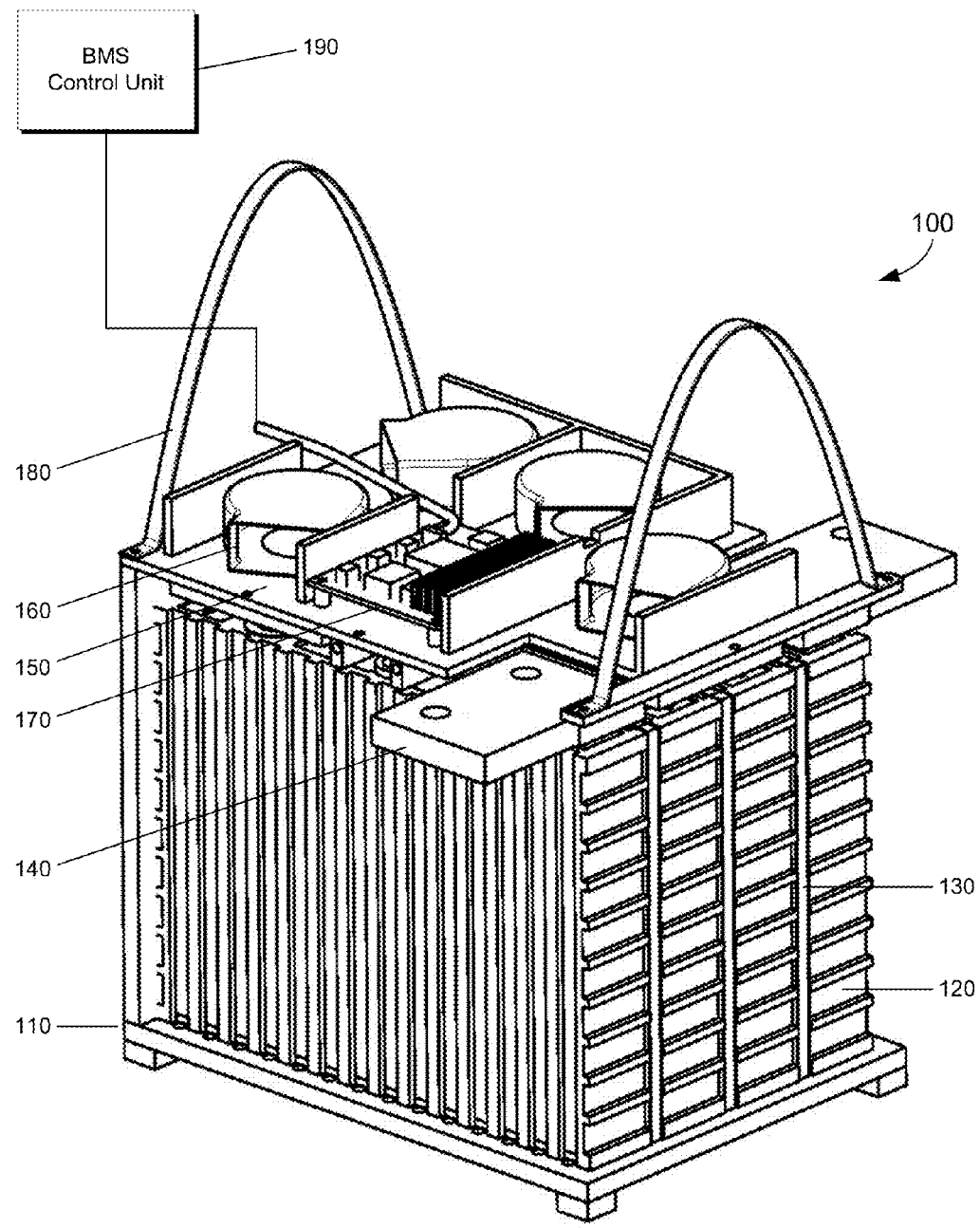
FIG. 1 provides an isometric view of an exemplary high-current rapid charging battery module.

FIG. 1 is an isometric view of an exemplary high-current rapid charging battery module 100. Battery module 100 includes a case 110, four battery cells 120, three air flow cartridges 130, a number of busbars 140 that electrically connect battery cells and additionally provide thermal dissipation, a control housing 150 that includes four fans 160 for ventilating exhaust air, a battery module regulator 170 and two straps 180 for carrying battery module 100. Each of the above-mentioned components is described in further detail with reference to FIGS. 2-6. The exact quantities of each item as listed above, e.g. cells, air flow cartridges, busbars, fans, etc., are used in a preferred embodiment. However, they are not intended to be limiting and different numbers of each item may be used without departing from the scope and spirit of the subject invention. For example, FIG. 7 depicts an alternative embodiment of a battery module with 8 cells.

As described in greater detail with reference to FIG. 8 one or more battery modules are typically connected in series and/or in parallel within a battery pack. In one embodiment, the battery pack is integrated into a vehicle such that air can be drawn directly from the bottom exterior of the vehicle, up and through the modules and exhausted through an exhaust duct to the rear of the vehicle to achieve uniform cooling throughout the pack.

Battery module regulator 170, henceforth referred to simply as regulator 170, communicates through a data cable, a wireless connection, or other means to a battery management system (BMS) control unt 190. Taken together, BMS control unit 190 along with each regulator 170 in a battery pack constitute a battery management system (BMS) that manages all battery modules 100 in a battery pack, such as by monitoring their states, calculating data, reporting that data, controlling their environments, and controlling the battery charging process.

In one embodiment, there is one regulator 170 for each battery module 100 in a battery pack and one BMS control unit 190.

Figure 2:
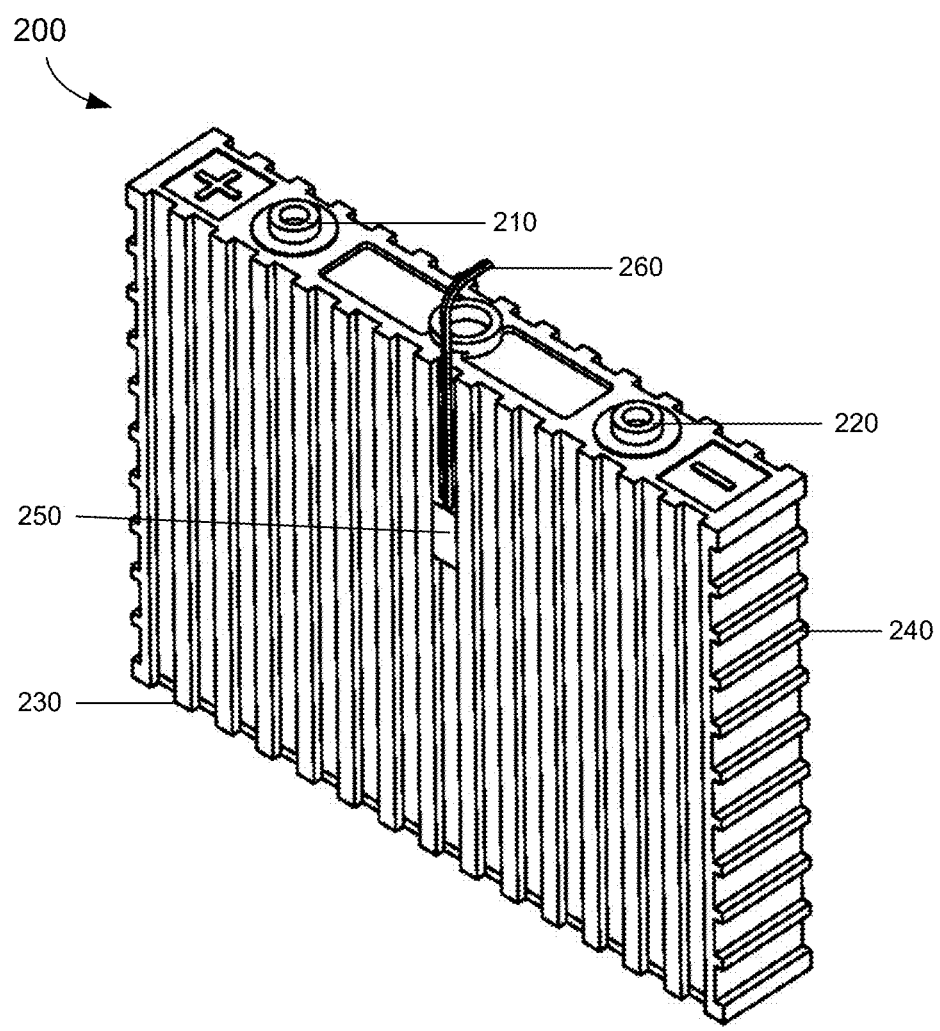
FIG. 2 illustrates an exemplary cell used in a high-current rapid charging battery module.

FIG. 2 illustrates an exemplary battery cell 200 used in high-current rapid charging battery module 100. Essentially, cell 200 is an embodiment of one of cells 120. In one embodiment, cell 200 is a Lithium Iron Phosphate battery cell, model TS-LFP260AHA, provided by Thunder Sky Battery Limited of Shenzhen, China. The key parameters of this cell are a charge voltage of 3.75 to 4.20 volts, energy capacity of 260 amp hours, dimensions 275 mm height, 362 mm length, 55.5 mm width, and maximum operating temperature of 85 degrees centigrade.

Cell 200 has a positive terminal 210 and a negative terminal 220 each of which connects to a different busbar 140 when included in battery module 100. Moreover, cell 200 has a number of ribs 230 that protrude vertically on its length and a number of ribs 240 that protrude horizontally on its side. Additionally, a temperature sensor 250, typically implemented as a thermistor, is affixed to one side of cell 200. A signal wire 260 connects temperature sensor 250 to regulator 170 for the purpose of providing temperature readings from the exterior of cell 200.

However, the present invention is not limited to this particular brand or size of cell. Generally, the present invention works with all standard cell packagings including prismatic, pouch cells, and cylindrical cells. Further, the present invention works with cells of any battery chemistry including lithium-ion batteries. In this context, the term "lithium-ion battery" refers to a family of batteries in which lithium ions move from the negative electrode to the positive electrode during discharge, and back when charging. As examples, the subject invention works with battery cells with Lithium polymer, NiCD, and PbA among other cell chemistries.

Figure 3A:
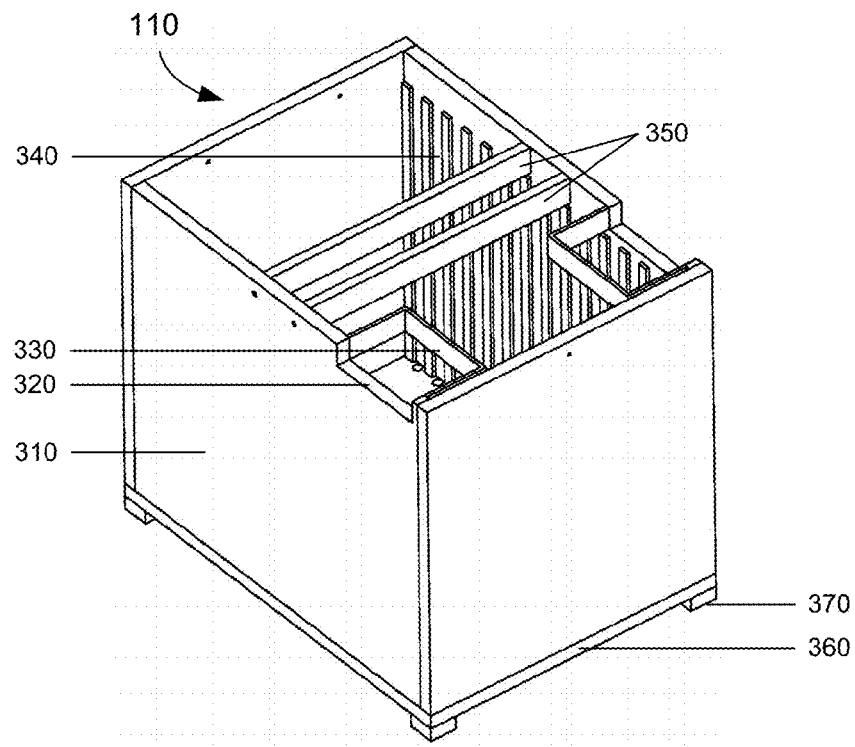
FIG. 3A illustrates an exemplary case for a high-current rapid charging battery module.

FIG. 3A illustrates an exemplary case for exemplary high-current rapid charging battery module 100. In a preferred embodiment, an exterior 310 is made of clear polycarbonate plastic. A cutout 320 enables a busbar such as busbar 140 to protrude in order to connect to another module within a battery pack. An air dam 330 prevents air from entering battery module 100 at the top, directly to the exhaust fan, thereby short-circuiting the air flow. A set of reguarly spaced, identical ribs 340 are affixed to each interior side of case 110. Ribs 340 contact cells 120 both to hold cells 120 in place laterally and to prevent cells 120 from swelling. Also, ribs 340 create a vertical air channel through which air is drawn from the bottom of case 110 upwards to a fan such as fan 160. In one embodiment there are 15 ribs 340 and each rib 340 is constructed from case plastic. In a preferred embodiment, each rib aligns and is press fit against one of ribs 230 on the adjacent cell 120.

One or more tension straps 350 add structural integrity to the case and further inhibit cells 120 from swelling by restricting the case from expanding laterally. Tension straps 350 connect opposite sides of case 110. In one embodiment, tension straps 350 are constructed of rigid plastic, ⅜ inch thick×1 inch tall×10⅞ inch long. In one embodiment, each end of each tension strap 350 is drilled and tapped, and is fastened through a drilled hole in case 110.

Figure 3B:
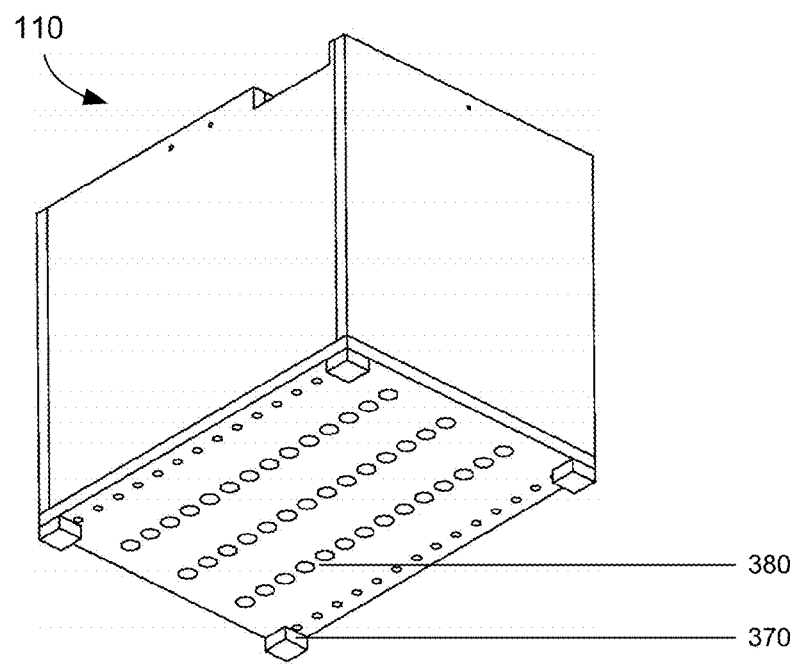
FIG. 3B provides an isometric view of the bottom of an exemplary case for a high-current rapid charging battery.

Now reference is made to FIG. 3B, which provides an isometric view of the bottom of an exemplary case for high-current rapid charging battery module 100. A case bottom 360 has one or more perforations 380, or holes, that enable air to be drawn from below case 110 up through air channels created by the gaps between ribs 340 and cells 120, and through air flow cartridges 130 between cells 120 as will be discussed further below with reference to FIG. 4.

An optional foot 370 may be placed in each of the four bottom corners of case 110. Mounting feet 370 are typically not used in embodiments where battery module 100 is integrated into the vehicle's chassis such that air is drawn directly from the exterior of the vehicle through perforations 380.

Case 110 includes a solid plastic lid strong enough to allow a battery installation or maintenance technician to walk on top of it while performing installation or maintenance tasks. This is necessary as a battery pack may include more than a dozen battery modules making it difficult to reach a particular battery module 100 without stepping on or placing weight upon adjacent modules.

In one embodiment, a solid material is placed adjacent to each perforation 380, on the underside of cells 120, aligned between vertical ribs 230, to prevent air from flowing beneath each cell 120. This forces air to flow vertically between ribs 230 of each cell 120, and not underneath any cell 120. In a preferred embodiment, a phase change material is used for this purpose. The phase change material absorbs and dissipates thermal energy, and thereby truncates extremes in temperature by lowering the peak temperatures resulting from high-current rapid charging. In one embodiment, a paraffin wax is used for phase change material.

Figure 4:
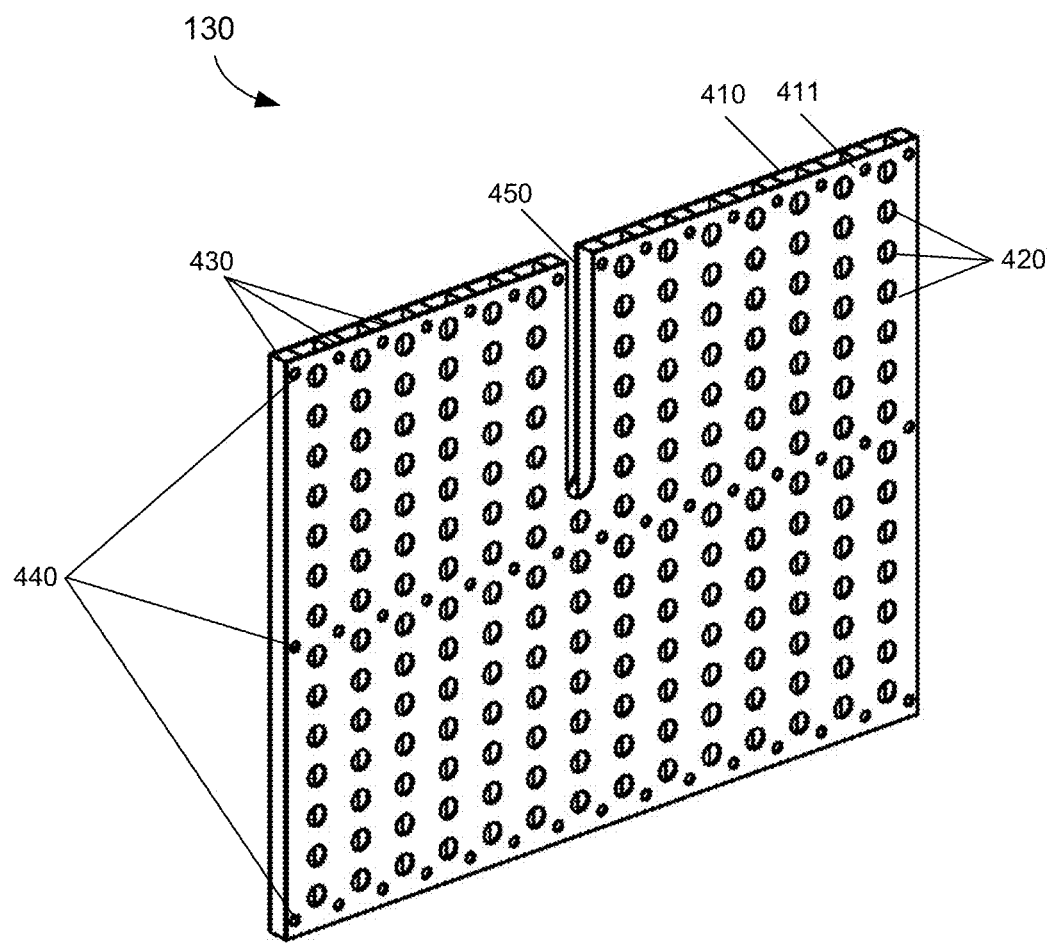
FIG. 4 illustrates an exemplary air flow cartridge used in a high-current rapid charging battery module.

FIG. 4 illustrates an exemplary air flow cartridge 130 used in high-current rapid charging battery module 100. Air flow cartridge 130 serves as a rigid structural element, but is also perforated to promote turbulent airflow between cells 120. One air flow cartridge 130 is placed between each adjacent pair of cells 120. Thus, battery module 100, which has four cells 120, has three air flow cartridges 130.

Air flow cartridges 130 may be made of any lightweight, non-compressible material. In one embodiment, air flow cartridges 130 are made of polycarbonate plastic. They may also be made from aluminum or other conductive or non-conductive material.

Air flow cartridge 130 includes two parallel plates 410 and 411 separated by a number of spacers 430. Each spacer 430 is attached to plate 410 on one side and plate 411 on the other side. In a preferred embodiment, there are 15 spacers 430 each aligning vertically with one of cell ribs 230. In a preferred embodiment, plates 410 and 411 and spacers 430 are made from polycarbonate plastic and are solvent-bonded together.

In another embodiment, aluminum alloy may be used for plates 410-411 and spacers 430. In this embodiment, each spacer 430 is joined by welds, e.g. through three weld spots 440, to plate 410 on one side and plate 411. After welding, the weld spots are gound to be flush with plate 410 and plate 411 to prevent a rough weld spot from scraping against the side of cell 120 and causing damage.

Structurally, air flow cartridge 130 prevents its two adjacent cells 120 from swelling, i.e. it keeps each cell 120 from expanding laterally. Swelling of battery cells is a common problem that may result in loss of cell capacity and cycle life.

In one embodiment, each of plates 410 and 411 has ⅜" circular perforations 420 with a ¾" vertical distance between adjacent centers. Perforations 420 promote turbulent airflow between adjacent cells 120.

A cutout 450 enables temperature sensor 250 and its signal wire 260 to be affixed to an adjacent cell 120 without the risk of being pinched or compacted against one of plates 410-411 during module assembly.

Figure 5:
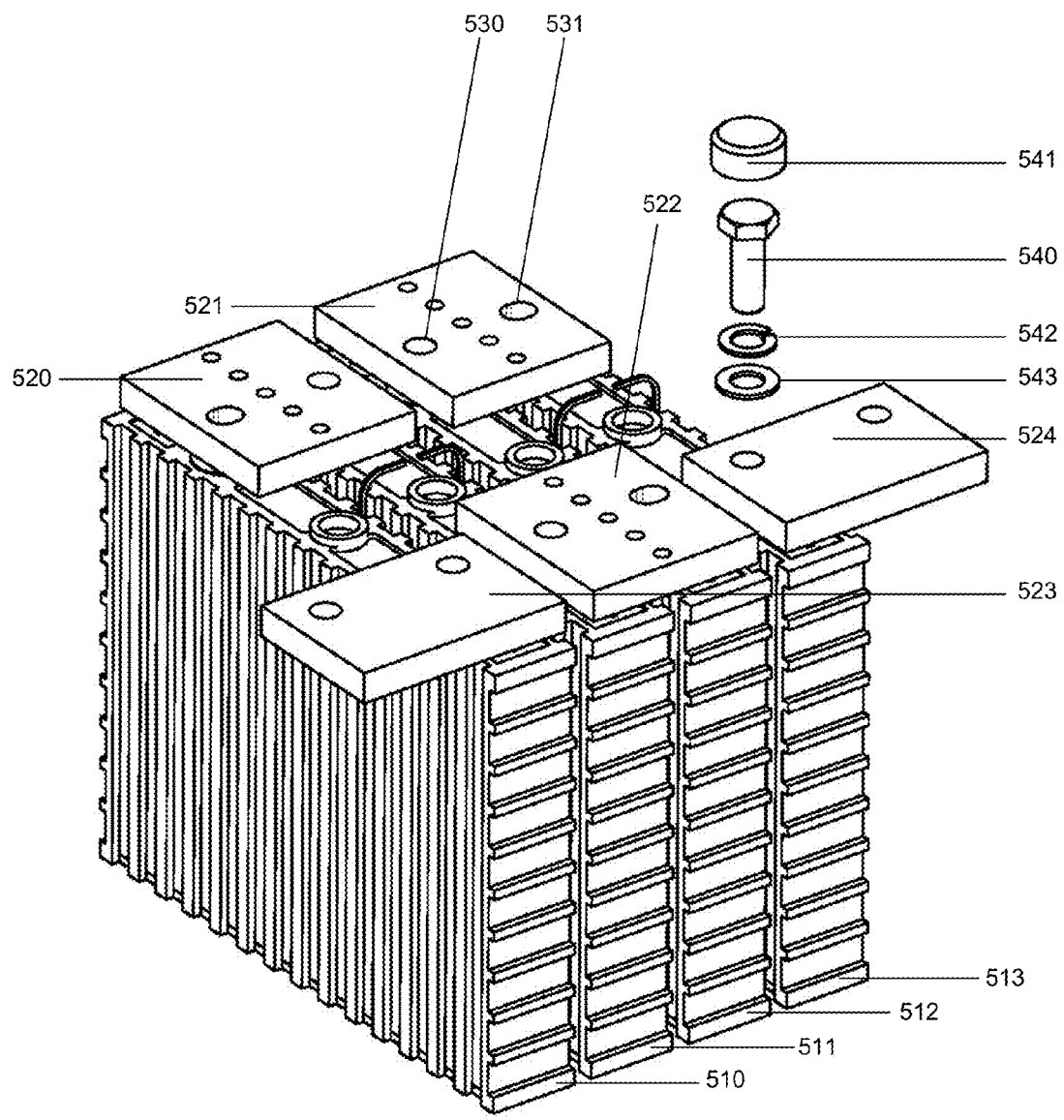
FIG. 5 illustrates the arrangement of cells, and bus bars in an exemplary high-current rapid charging battery module.

FIG. 5 illustrates the arrangement of cells and busbars in exemplary high-current rapid charging battery module 100. A busbar 140 connects to the positive and negative terminal of each battery cell included in battery module 100. To enable conduction of current between cells, busbar 140 always connects a positive terminal to the negative terminal of the next cell in series. Since exemplary battery module 100 has four cells 510-513, which are instances of cells 120, it has three busbars 520-522 that connect cells within battery module 100. Moreover, two busbars 523-524 connect battery module 100 to other adjacent battery modules in a battery pack.

In one embodiment, each of busbars 520-524 is rectangular, rigid, and made of solid copper. In a preferred embodiment, busbars 520-522 have a cross section of ⅝ inch by 5 inches and a length of 4⁷⁄₁₆ inches while busbars 523-524 have a cross section of ⅝ inches by 3¾ inches, and a length of 6 inches. Although prior art busbars are rectanglular in size, other sizes including irregular sizes that promote improved thermal or electrical conductivity are feasible.

Typically, busbars used for carrying high current are made from either copper or aluminum. Because prior art busbars used for conveying up to 700 amps of current typically have significantly smaller cross-sections, busbars 520-524 are referred to as massive copper bars. Table 1, below, compares cross-sections recommended by the Copper Development Association, located in New York, N.Y. for busbar ampacity, with cross sections recommended for massive copper bars according to an embodiment of the subject invention. Table 1 presents three levels of cross section recommendations, a minimum recommended cross section, a preferred cross section and a most preferred cross section for each of three levels of charge current, 150 amps, 400 amps and 700 amps.

TABLE 1

Comparison of Copper Development Association (CDA) Recommended Cross Sections (A) with Massive Copper Bar (MCB) Recommended Cross Sections (all cross-sections in sq. in.)

| Charge Current | CDA-Recommended Cross section (B) | MCB Minimum | MCB Preferable | MCB Most Preferable |
|---|---|---|---|---|
| 150 amps | .0625 | .125 | .219 | .313 |
| 400 amps | .281 | .562 | .984 | 1.406 |
| 700 amps | .562 | 1.124 | 1.969 | 2.813 |

Note A:
From Copper Development Association Publication A6022: Ampacities and Mechanical Properties of Rectangular Copper Busbar.

Note B:
The Copper Development Association provides several alternative dimensions in some cases for a given ampacity. Where there is more than one alternative only the largest of the cross sections is presented in Table 1.

Further, the cross-sections are for a maximum 30 degree C. rise in temperature when carrying the specified current.

Thus, busbars 520-524 which follow the recommendation for massive copper bars given in Table 1, above, are oversized in relation to the electrical conductivity requirement. However, the massive copper bars used by the subject invention conduct heat away from cells 120 and thus mitigate the rise in cell temperature during high-current rapid charging.

In a preferred embodiment, busbars 520-522 are perforated, allowing air to flow through them. In one embodiment, each of busbars 520-522 has a single row of five holes where each hole has a ⅜ inch diameter, and each hole is positioned vertically above an air gap between spacers 430.

In a preferred embodiment, busbars 520-524 are partially coated or sealed with a material that electrically insulates them from other busbars. For example, the edge or side of 520-524 can be coated with a thin plastic insulator. This prevents short-circuit from occurring in the event of a fastener failure resulting from extreme dynamic loads an auto may experience, including a collision or other catastrophic event.

Further, stranded copper cable may be used for busbars 520-524 but is less desirable as it increases the internal resistance of the pack due to the need for lugs and soldering or crimping. To carry 700 amps of current two MCM 350 cables would typically be used for electrical conductivity.

Each busbar 520-524 is connected to a cell terminal, such as terminal 210 or terminal 220, by two identical fasteners 540. Battery module 100 uses oversize conductive metal fasteners 540 for purposes of both electrical and thermal conductivity. In one embodiment, fastener 540 is an oversized, hex, brass bolt, together with a brass flat washer 543 and a bronze lock washer 542, and an insulated cap 541 placed on the bolt's hex head. In one embodiment, the brass bolt used in fastener 540 is oversize, measuring 14 mm diameter×46 mm length to minimize the internal resistance of the cell connection. In one embodiment, silver doped conductive grease is used to coat terminals 210-220, between the cell terminal and the busbar, to improve electrical conductivity and to minimize corrosion. In one embodiment, each busbar 520-524 is drilled with one hole 530 and one slot 531, each of which accommodate one fastener 540. The use of a slot 531, rather than a second identical hole, accommodates any variations in machining or manufacturing during final fit and assembly.

Figure 6:
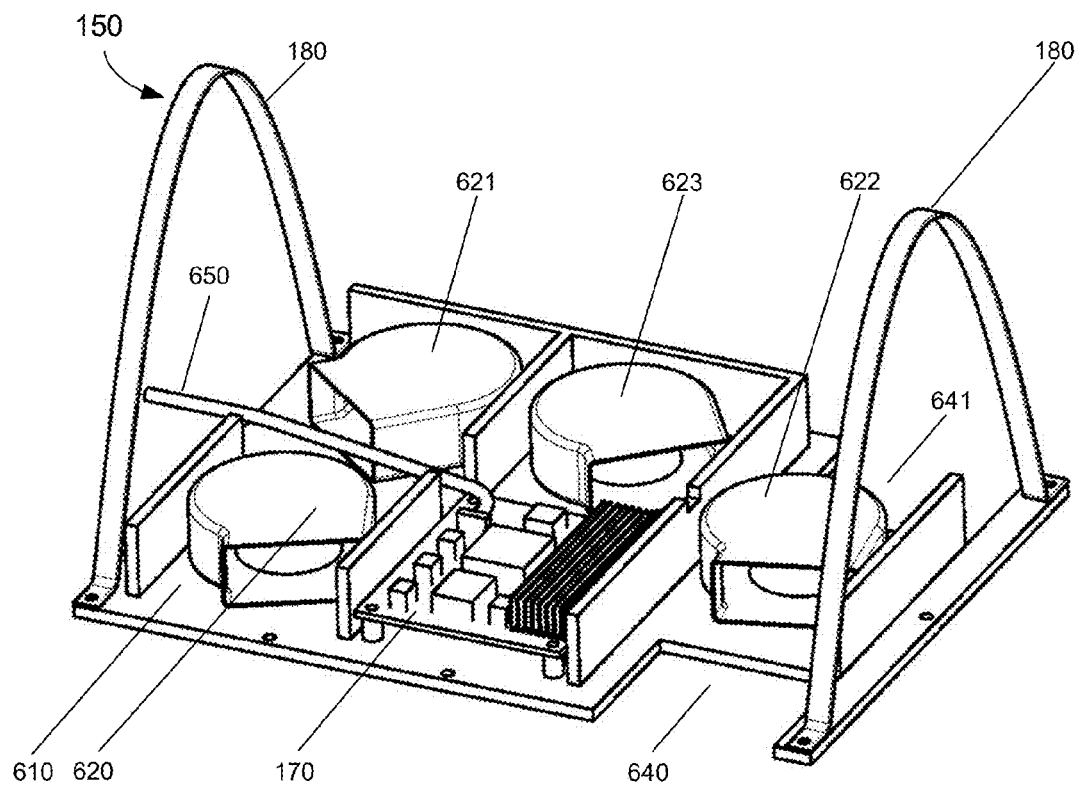
FIG. 6 illustrates a control housing of a high-current rapid charging battery module that includes fans and a battery module regulator.
Figure 7:
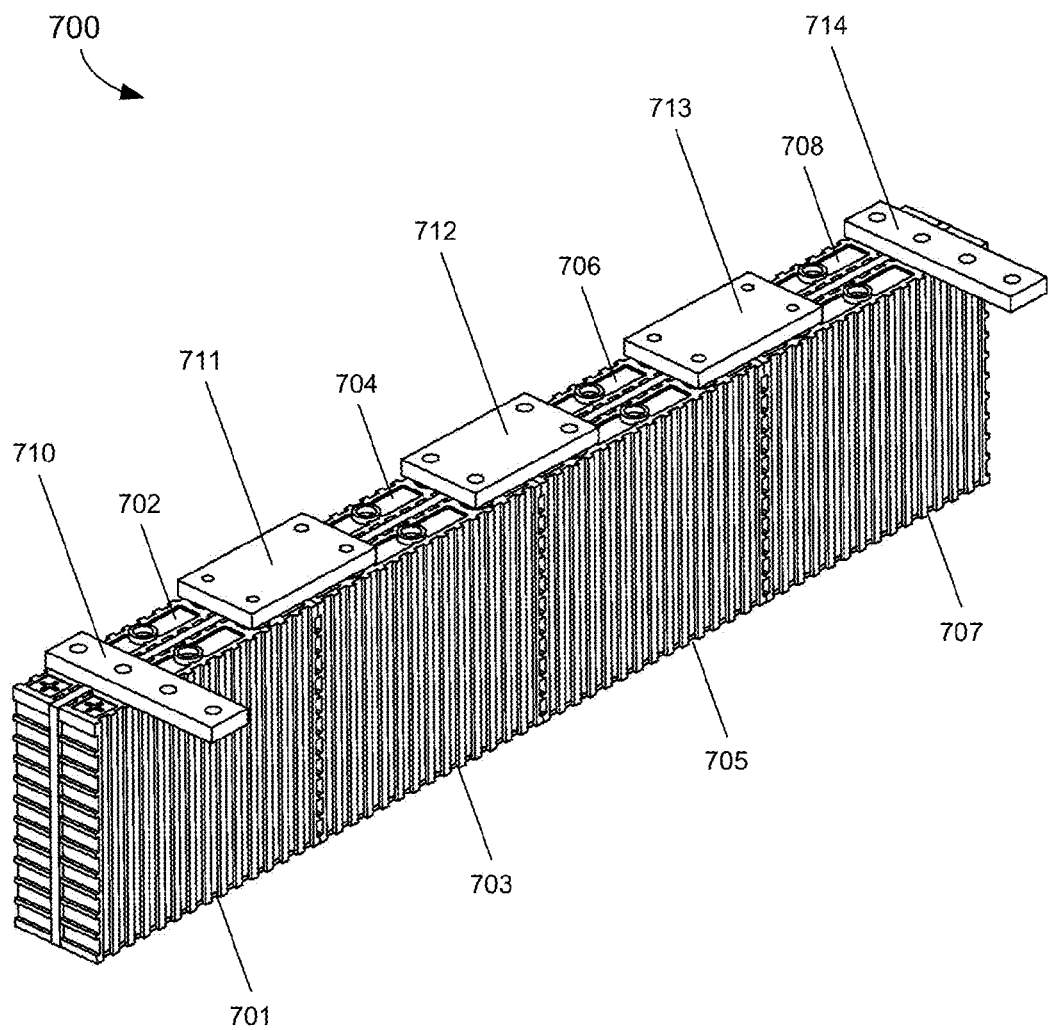
FIG. 7 illustrates an alternative battery module design for a high-current rapid charging battery module.

FIG. 6 illustrates a control housing of high-current rapid charging battery module 100 that includes blower fans and a battery module regulator 170. Control housing 150 includes a plastic case 610 that is comprised of a plastic top (not depicted), four fans 620-623, regulator 170, and two carrying straps 180. A cutout 640 on one side of control housing 150 enables busbar 523 to connect to a terminal on battery module 100 and to fit into an adjacent control housing 150; similarly an identical cutout 641 on the opposing side of control housing 150 enables busbar 524 to connect to its adjacent battery module 100 and to fit into that adjacent battery module 100 control housing 150.

Blower fans 620-622, each with a variable power control, are used for cell cooling. In one embodiment, an additional blower fan 623 is used both to cool cells and to cool equalization circuits included in regulator 170. An example blower fan that may be used for blower fans 620-623 is the RL65DC radial blower from EBM-PABST, Inc. of Farmington, Conn. This blower operates at speeds up to 4500 RPM and blows air at up to 32.9 cubic feet per minute (CFM). Regulator 170 provides a power level signal and an on/off control to each of fans 620-623 based on cell temperature readings. Additionally, heat sinks dissipate heat from equalization circuits on regulator 170. In one embodiment, blower fan 623 is actuated also by heat sink temperature.

In a preferred embodiment, fan speed is modulated as a function of temperature range and external ambient temperature. Fans are turned off below a temperature threshold, where the threshold is typically a value between 90 to 100 degrees F. The power level is set to "Low" when temperatures exceed the threshold and linearly increases to "Maximum" at the top of the temperature range. The top end of the range is typically between 110 to 120 degrees F. When ambient temperature is above the threshold, fan actuation is delayed until cell temperature exceeds ambient temperature or reaches the top of the temperature range, whichever occurs first.

When operating, fans 620-623 draw relatively cool air up from the exterior of the vehicle through perforations 380 in case bottom 360 towards the fans, and blow the exhaust air out of battery module 100. The exhaust direction is configurable in order to accommodate optimal air flow at the battery pack level. This has the effect of drawing heat away from the cells 120 through air flow cartridges inside case 110 and exhausting the relatively heated air to the exterior of battery module 100.

In one embodiment, each of fans 620-623 draws up to 1.25 amps of current at a 12 volt nominal voltage. A 100 watt power supply, integrated into regulator 170 provides variable power to fans 620-623.

Blower fans 620-622 are placed at or near each busbar 520-522 to maximize heat extraction at each cell connection. The fourth blower fan 623 is placed near regulator 170 to maximize heat extraction from the equalization circuit heat sinks. Slight offsets are made in the geometry between blower fans 620-623 to enable air flow between cells 120 and case ribs 340, as well as through the geometric center of battery module 100.

Based on configuration and measurements, there may also be additional fans or other air cooling mechanisms inside battery module 100 in addition to cooling fans 620-623. Other embodiments of battery module 100 may have more or less fans, draw more or less power, based on module size, cell chemistry, charge current and other conditions.

Regulator 170, implemented in exemplary battery module 100 as a digital electronics card with a microprocessor and non-volatile memory for storing program code and data, manages a variety of functions including inter alia monitoring the state of battery module 100 and cells 510-513, controlling fans 620-623, recording data, receiving control signals from BMS control unit 190, and sending control signals to a charger and a motor controller. Regulator 170 is powered at 12 volts nominal voltage directly from battery module 100.

BMS control unit 190, implemented in exemplary battery module 100 as a digital electronics card with a microprocessor and non-volatile memory for storing program code and data, sends control signals to one or more regulators 170 and receives data from additional sensor inputs. As discussed below with reference to FIG. 8, typically, BMS control unit 190 has a data connection to all modules 100 in a battery pack. BMS control unit 190 performs a dynamic charging algorithm, as described below with reference to FIG. 9, and sends resulting control signals to each regulator 170 in a battery pack. Additionally, BMS control unit 190 stores or calculates a target voltage which it uses to perform the dynamic charging algorithm. Typically, regulator 170 sends signals to the vehicle's motor controller. Also, regulator 170 sends signals to a battery charger to control the input current levels during charging. The battery charger may be onboard, i.e. a device also within the vehicle, or offboard, i.e. a device separate from the vehicle.

Acting cooperatively, regulator 170 and BMS control unit 190 act as a battery management system (BMS).

Regulator 170 monitors the state of battery module 100 as represented by some or all of the following characteristics: temperature (cell temperature, busbar temperature, ambient temperature, exhaust air temperature); and voltage (individual cell voltage). Also, regulator 170 typically stores and reports additional values including: minimum and maximum permissible cell voltage, historical high and low cell voltages, maximum cell temperature, and a target charge voltage.

In one embodiment, a separate ammeter and shunt are used to measure current and to count amp hours. BMS Control Unit 190 reads this data and reports the updated target charge voltage to regulator 170 in real-time.

In one embodiment, regulator 170 is a customized or enhanced version of a commercially available regulator card such as the MK3×4SM Digital Lithium Regulator from Manzanita Micro of Kingston, Wash.

The MK3×4SM Digital Lithium Regulator is a printed circuit assembly that regulates four lithium-ion cells. The size of the card is approximately 3.5 inches×5 inches with one equalization channel per cell. Features of the MK3×4SM Digital Lithium Regulator that regulator 170 requires include real-time voltage monitoring, real-time sensing of up to 5 temperature sensors, cell equalization and balancing with high and low voltage on board indicators and outputs to the charger, real-time warning lines which can be relay buffered for external use, and the ability to connect together multiple regulators.

In one embodiment, regulator 170 adds several unique features not currently provided by commercially available battery module regulators including dynamic values for charging algorithm, rapid equalization circuits that support the higher current levels required for high-current rapid charging, a higher power than normal, e.g. 100 W, power supply for blower fans 620-623, and shielding to prevent signal corruption due to the high current that may be drawn by blower fans 620-623, Regulator 170 includes a data cable 650, or other data communications means, including serial communications or DC-Bus, for communicating with other equipment, such as BMS control unit 190. In one embodiment, the BMS uses dual RJ bus ports, designed to allow microcontrollers and devices to communicate with each other within a vehicle, and to communicate with other equipment.

Now reference is made to FIG. 7, which illustrates an alternative battery module design 700 for high-current rapid charging battery module 100. Exemplary battery module 700 is an alternative embodiment of battery module 100. Module 700 includes eight cells 701-708. Adjacent pairs of cells are connected in parallel and the resulting double cells are connected in series. Thus, cell pairs 701 and 702, 703 and 704, 705 and 706, and 707 and 708 are each connected in parallel, and form four double cells. Busbar 710 and busbar 714 either connect module 700 to another module in a battery pack or are themselves battery pack terminals. Busbar 711 connects double cell 701-702 to double cell 703-704. Busbar 712 connects double cell 703-704 to double cell 705-706. And Busbar 713 connects double cell 705-706 to double cell 707-708.

In one embodiment, each of cells 701-708 is a Thunder Sky TS-LYP300AHA, 300 amp hours per cell. Connecting two such cells in parallel creates a 600 amp hour double cell; connecting four double cells in series yields a 12.8V module, where each pair of cells has a 3.2V nominal voltage.

Figure 8:
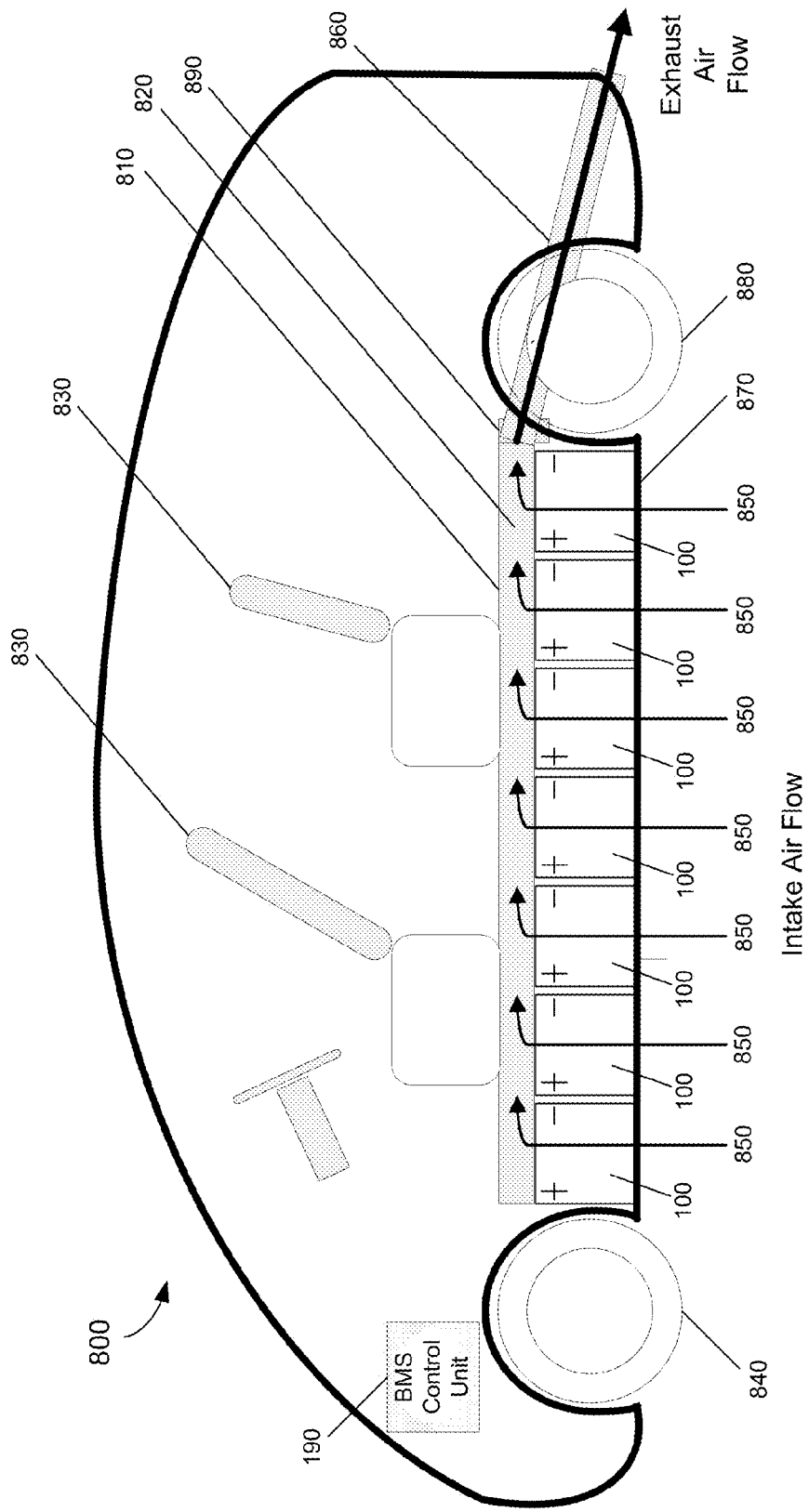
FIG. 8 illustrates an exemplary high-current rapid charging battery pack integrated within an electric vehicle.

Now reference is made to FIG. 8, which illustrates an exemplary high-current rapid charging battery pack integrated within an electric vehicle (EV) 800. Only the elements of EV 800 necessary to understand the location and function of its component battery pack 810 are depicted. Batttery pack 810 is integrated into an EV chassis 870 and draws air directly from the exterior of EV 800. One or more seats 830, of which two are depicted, are fixed on top of battery pack 810. Further, battery pack 810 is situated between a front wheel 840 and a rear wheel 880. Exemplary battery pack 810 includes an overhead exhaust duct 820 and four rows of seven battery modules 100. For each battery module 100, its regulator 170 connects to another regulator 170, and includes a connection to BMS control unit 190, which is depicted as physically separate from battery pack 810. In some embodiments, BMS control unit 190 is integrated within battery pack 810.

An air flow arrow 850 indicates the direction of air flow through each battery module 100 included in battery pack 810. Air is drawn from the exterior of EV 800 through perforations 380 in case bottom 360 and is then exhausted into duct 820 that directs the exhaust air to the rear of battery pack 810 from which point it is forced by one or more exhaust blowers 890 into one or more exhaust pipes 860 which conduct the air to the rear exterior of EV 800.

Dynamic Charging Algorithm for High-Current Rapid Charging

The thermal management and electrical conductivity characteristics of battery module 100 described with reference to FIGS. 1-8 enable battery module 100 to be rapidly charged using high-currents while maintaining cell temperatures within an acceptable range and degree of uniformity. To safely manage high-current rapid charging, regulator 170 monitors in real-time the voltage of cells 510-513 and sends control signals to a battery charger that regulates the current delivered by the charger to the battery pack. In a series pack, i.e. a series of interconnected battery modules within a battery pack, each battery module 100 receives the same basic charge current from the battery charger. While a standard algorithm for charging a lithium-ion battery is well known, the characteristics of high-current rapid charging battery module 100 are sufficiently unique that adjustments to the standard algorithm are required.

Standard Charging Algorithm

The standard, prior art, algorithm for charging a lithium-ion battery is to charge for an initial period, referred to as a "bulk charge phase", at an initial, constant, current, referred to herein as $I_0$, until the battery reaches a manufacturer-specified maximum charge voltage, referred to herein as the specified charge voltage, $V_{MAX}$. The magnitude of the initial current, $I_0$, depends on characteristics of the battery cell as well as the battery charger's peak output. Then, current is reduced while maintaining peak voltage of $V_{MAX}$ until a "sufficient" condition, or reduced current threshold, is reached. The sufficient condition, henceforth referred to as the cutoff current, is defined relative to the capacity of the battery cell in amp hours. The top charging voltage, $V_{MAX}$, and the cutoff current, $I_C$, are typically specified by the cell manufacturer and vary slightly for cells from different manufacturers or with different chemistries.

High-Current Rapid Charging Algorithm

The subject invention modifies the standard charging algorithm for high-current rapid charging. As previously discussed, in high-current rapid charging, a high current of 150 to 700 amps is applied during the initial bulk charging phase. At high current levels a voltage rise, evidenced at the connection of the busbar to each cell, is included in the measured cell voltage during charging, and is especially significant at high currents. When rapid charging with high currents the voltage rise should be accounted for in determining optimal target charge voltages. In one embodiment, to take a voltage reading from a cell, a ring terminal with a crimped connection and thin guage copper wire attached, is placed between fastener 540 and the busbar connected to terminal 210, the positive terminal of cell 200. Voltage is measured for cell 200 between the two ring terminals of adjacent cells 200. The product of the resistance of the busbar connection times the charge current becomes a non-trivial voltage rise during high-current rapid charging. Actual cell voltage equals measured voltage minus this voltage rise.

Figure 9:
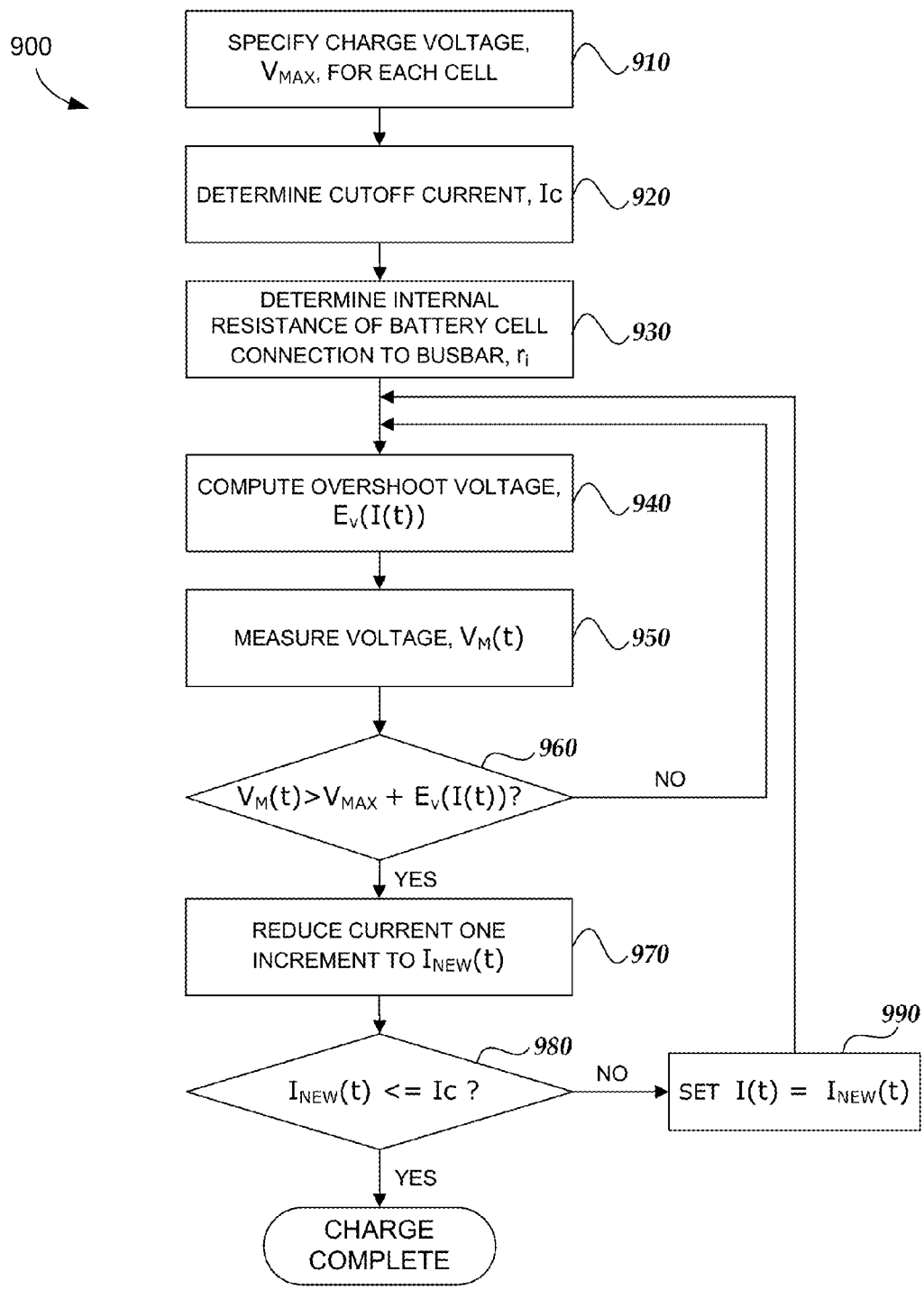
FIG. 9 presents a dynamic charging algorithm for rapidly charging using high current a high-current rapid charging battery module.

With this background, a dynamic charging algorithm 900 for rapidly charging a high-current rapid charging battery module, such as battery module 100, using high current, is now described with reference to FIG. 9. At step 910 the specified charge voltage, $V_{MAX}$, is established for each cell. As previously mentioned, $V_{MAX}$ is typically specified by the cell manufacturer. For example, in an embodiment in which cells 510-513 are each a Lithium Iron Phosphate cell, model TS-LFP300AHA, provided by Thunder Sky, each cell has a specified charge voltage, $V_{MAX}$, of 3.75 volts per cell, or 15 volts (3.75 volts per cell×4 cells) for battery module 100.

At step 920 the cutoff current, $I_C$, is determined. As previously mentioned, $I_C$ is typically specified by the cell manufacturer. In the embodiment using Thunder Sky cells, model TS-LFP300AHA, the cutoff current, $I_C$, is specified by the manufacturer as 6.0 amps of current, which is proportionate to 2% of the capacity of battery module 100 in amp hours.

At step 930 the internal resistance at each busbar connection is determined. These resistance values are denoted $r_i$ where i refers to the ith cell. For example, the internal resistance of each of the busbar connections at cells 510-513 is 0.107 milliohms, resulting in an $r_i$ of 0.214 milliohms (2×0.107). At a charge current of 700 amps, this equates to 0.15 volts per cell of measured voltage rise (0.214×10$^{-3}$ Ohms×700 A=0.15V). This measured voltage rise, or overshoot voltage, is referred to as $E_V(I(t))$.

At step 940, the overshoot voltage, $E_V(I(t))$ at time t is computed or is referenced from a user table with charge current as the index. The overshoot voltage is the instantaneous voltage rise that is caused by the internal resistance of the busbar connections times the charge current. The overshoot voltage at time t is added to $V_{MAX}$ during charging to dynamically determine the optimal target charge voltage for that level of charge current. Since the charge current varies during the charge process, $E_V(I(t))$ must be recomputed in real time throughout the charge process. $E_V(I(t))$ is given as:

$$E_V(I(t))=I(t)*r_i$$

where I(t) is the current at time t. As previously discussed, in the embodiment of battery module 100 using cells 510-513 where $r_i$=0.214 milliohms for busbar connections at cell i, with a charge current of 700 amps, $E_V(I(t))$ is calculated as 0.15 volts.

At step 950, cell voltage, $V_M(t)$, is measured for all cells in all modules in a pack. Then at step 960 a determination is made as to whether any $V_M(t)$ is greater than $V_{MAX}+E_V(I(t))$. If so, then at step 970 regulator 170 sends a control signal to the charger that results in the charger reducing the current by one increment, where an increment may be, for example, a fixed value such as 10 amps, or a fixed percent of I(t) such as 5%, to all battery modules. The reduced charge current is referred to as $I_{NEW}(t)$. Control subsequently resumes at step 980. If at step 960 $V_M(t)$ is less than or equal to $V_{MAX}+E_V(I(t))$ then the instantaneous target voltage is not exceeded, in which case charging continues at the present level of current, and after a short period of time, control returns to step 940.

At step 980 a determination is made as to whether the new charge current, $I_{NEW}(t)$, is less than or equal to the cutoff current, $I_C$. If so, then charging is complete. At this point, the battery has reached 100% SOC. In this example, 100% SOC is reached, as defined by the manufacturer, when battery module 100 exhibits all cells at 3.75 volts when charging at 6.0 amps. It may be appreciated that at 6.0 amps of charge current, the overshoot voltage, $E_V(I(t))$=0.214 milliohms per cell×6.0 amps=0.001 volts, is negligable.

It may further be appreciated that during the bulk charge phase the waste heat grows in relation to the square of the current as governed by the equation for electrical power $P=I^2R$. A module charging at 700 amps current generates over 30 times the waste heat as does charging the same module at 125 amps. In a lithium-ion battery, overheating can lead to catastrophic failure.

If at step 980 new charge current, $I_{NEW}(t)$, is greater than the cutoff current $I_C$, then at step 990 I(t) is set to the revised current level, $I_{NEW}(t)$, and after some period time and continued charging at the new current level the algorithm resumes at step 940.

It may be appreciated by one skilled in the art that following the standard charging algorithm to charge cells 120 in an embodiment that uses Thunder Sky, model TS-LFP300AHA, cells, an initial current, $I_0$, is applied during the rapid charge bulk phase until each of cells 510-513 reaches a measured voltage of 3.75 volts; this includes up to 0.15 volts of voltage rise caused by busbar connections to the cell. At 700 amps of charging, and a reading of 3.75 volts, the actual cell voltage is only 3.60 volts. Then, current is reduced, maintaining the $V_M(t)$ value at 3.75 volts (cell voltage plus voltage rise at the busbar connections) for each cell in battery module 100, until the charge current decays to 6.0 amps, the cutoff current. In contrast, with dynamic charging algorithm 900, $I_0$, is applied during the rapid charge bulk phase (700 amps) until each of cells 510-513 reaches 3.9 volts ($V_{MAX}$+0.15 volts). In this case, the overshoot voltage, $E_V(I(t))$, of 0.15 volts ensures that cells are at 3.75 volts before any current tapering begins. The overshoot voltage is re-computed in real-time to prevent actual cell voltage from exceeding $V_{MAX}$, and will minimize the time required to reach $I_C$. A cell at 3.60 volts has a lower state of charge than does a cell at 3.75 volts (as much as 30% lower), and will require a disproportionately longer time to finish the charge under the standard algorithm.

Figure 10:
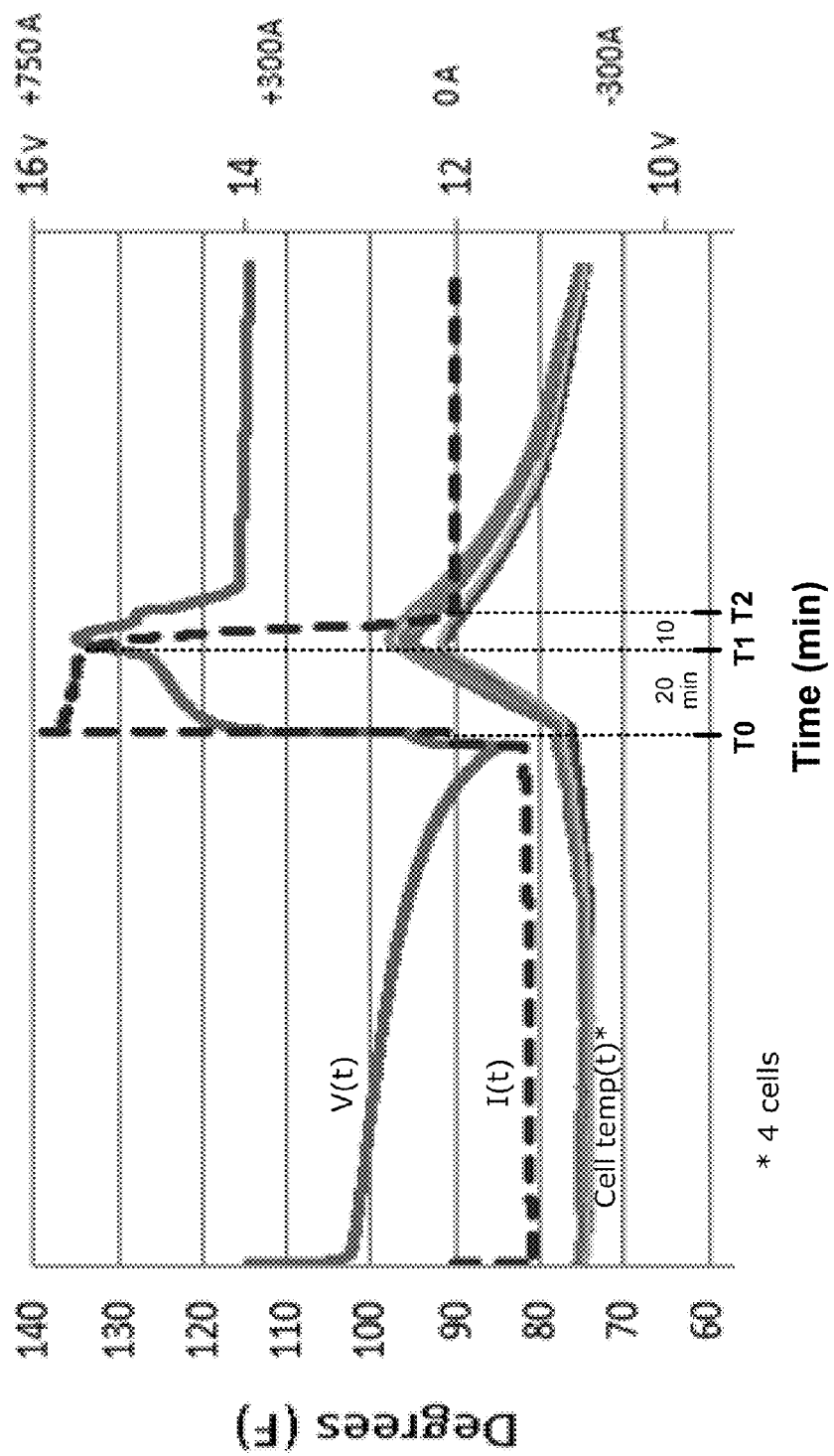
FIG. 10 is a graphical representation of voltage, current and temperature measurements taken while rapidly charging using high current a high-current rapid charging battery module in an embodiment that uses lithium-ion cells.

FIG. 10 is a graphical representation of voltage, current and temperature measurements taken while rapidly charging using high-current rapid charging battery module 100 in an embodiment that uses lithium-ion cells. The results illustrated in FIG. 10 apply to the embodiment of battery module 100, as depicted in FIG. 5, that has four battery cells 120, each of which has a 300 amp hour capacity. Further, the initial charge current, $I_0$, used during the bulk charge phase is 740 amps, and decays to 660 amps at the end of the bulk charge. (Charge current in this case is a function of fixed charger power and module voltage). One important goal of high-current rapid charging is to maximize the bulk charge envelope, as a percentage of SOC, using the highest possible current such that cell temperature can be maintained within safe and sustainable temperature limits. Thus, a key performance parameter is how long does the bulk charge phase last, and what percent of SOC is achieved during the bulk phase. A second performance parameter is how long it takes to reach 100% SOC, once the bulk charge phase is complete.

FIG. 10 identifies three critical moments during the charge process: T0, the beginning of rapid charging; T1, the end of the bulk charging phase; and T2, the cutoff, when charging terminates. The data used to create FIG. 10 was captured during testing of battery module 100. FIG. 10 graphs V(t), module voltage at time t (the sum of four cell 120 voltages), I(t), the input current provided to battery module 100, which follows the high-current rapid charge algorithm described with reference to FIG. 9, and the temperature of each of four cells 120 as measured by four temperature sensors 250, i.e. one temperature sensor 250 is affixed to the exterior of each cell 120 in battery module 100.

Prior to commencing the bulk charge phase, at T0, battery module 100 is discharged for a period of 2 hours to precipitate a low SOC drained battery, approximately 3% SOC. The bulk charge phase, from T0 to T1, lasts 20 minutes. The total current capacity that flows into battery module 100 during this period is 700 amps*20 minutes/60 minutes/hour=233.3 amp hours. Further experiments indicate that a charge of up to 96% SOC can be achieved during this 20 minute bulk charge phase, depending on the starting discharge SOC, and specified charge voltage $V_{MAX}$. The period from T1 to T2, the time to reach 100% SOC once the bulk phase is complete, lasts up to an additional 10 minutes. At T2 charge current falls below Ic, the cutoff current, and the charge terminates. The time period from T1 to T2 will vary as a function of specified charge voltage $V_{MAX}$ and Ic.

Thus, when high-current rapid charges at 700 amps, battery module 100 achieves 80% SOC in 20 minutes, and 100% SOC in 30 total minutes. This is enabled by regulator 170 that is engineered with equalization circuitry of 60 W per cell. When a cell's voltage reaches $V_{MAX}+E_V(I(t))$, a portion of the charge current is redirected into the equalization circuit which converts it into heat, which is in turn extracted by fan 623. Regulator 170 notifies BMS control unit 190 that its equalization circuit is active. Once all cells reach $V_{MAX}+E_V(I(t))$, regulators 170 send control signals to the charger that effectively taper the charge current until $I_C$ is reached.

The temperature of the cells increases during the bulk charge phase from an ambient temperature of roughly 74.5 degrees F. to a maximum temperature of roughly 97.5 degrees F., a rise of 23 degrees F. Thermal uniformity across cells within module 200 has been demonstrated through the bulk charge phase to be no more than +/−3.3 degrees F.

In reading the above description, persons skilled in the art will realize that there are many apparent variations that can be applied to the methods and systems described.

What is claimed is:

1. A method for high-current rapidly charging a battery module, comprising:
   determining the internal resistance added to each cell in the battery module by a busbar connection at each terminal of a cell;
   calculating an overshoot voltage for the battery cell based on the internal resistance of each cell's busbar connection in the battery module;
   applying a high-current rapid charge current to the battery module;
   measuring the voltage across each cell in the battery module; and
   periodically reducing the current applied to the battery module if the measured voltage of the battery module cells exceeds the overshoot voltage plus the maximum recommended charge voltage for any cell in the battery module.

2. The method of claim 1 further comprising halting the charging of the battery module if said reduced current is less than or equal to a specified cutoff value.

3. A battery management system for rapidly charging a battery module at high current, comprising:
   a battery module regulator for:
      measuring the voltage across each cell in the battery module;
      providing the cell voltage measurements to a control unit; and
   a control unit for:
      determining the internal resistance added to each cell in the battery module by a busbar connection at each terminal of the cell;
      calculating an overshoot voltage for the battery cell based on the internal resistance of each cell's busbar connection in the battery module;
      transmitting a control signal to a battery charger instructing the battery charger to apply a high-current rapid charge current to the battery module; and
      periodically transmitting a control signal to the battery charger to instruct the battery charger to reduce the applied current if the received cell voltage measurements of the battery module cells exceeds the overshoot voltage plus the maximum recommended charge voltage for any cell in the battery module.

4. The system of claim 3 wherein the regulator comprises rapid equalization circuits that provide higher levels of power dissipation as necessary for the higher current levels required for high-current rapid charging.

5. The system of claim 4 wherein the rapid equalization circuits provide at least 12.8 watts of waste heat dissipation per cell.

6. The regulator of claim 3 wherein the regulator further comprises shielding to prevent signal corruption.

7. The system of claim 3 wherein the maximum recommended charge voltage for each cell is temperature dependent and is specified by the cell manufacturer.

8. The system of claim 3 wherein the fundamental chemistry of the battery module cells are lithium-ion or lead acid.

9. The system of claim 3 wherein the standard charging algorithm for the battery module cells has a constant current, $I_0$, a maximum voltage, $V_{MAX}$, and a cutoff current, $I_c$.

* * * * *